Feb. 1, 1966   A. E. NEWTON   3,232,509
THERMOGRIP GUNS

Filed Aug. 5, 1963   2 Sheets-Sheet 1

Inventor
Albert E. Newton
By his Attorney

Feb. 1, 1966  A. E. NEWTON  3,232,509
THERMOGRIP GUNS
Filed Aug. 5, 1963  2 Sheets-Sheet 2
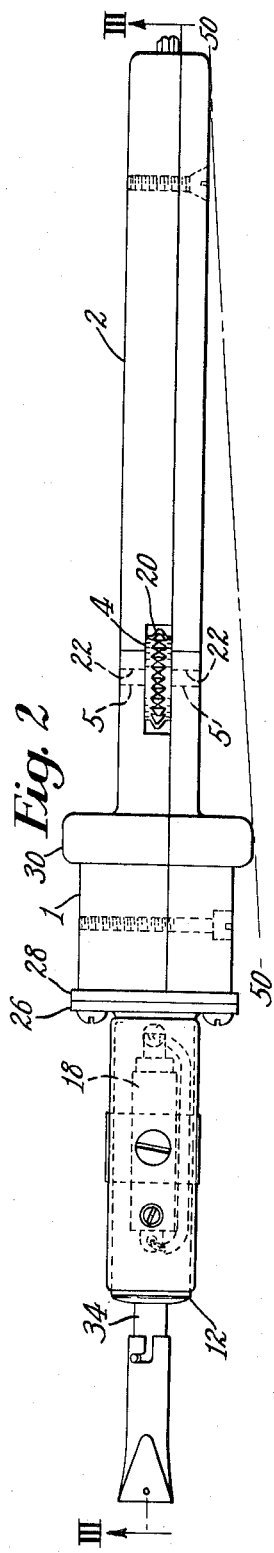
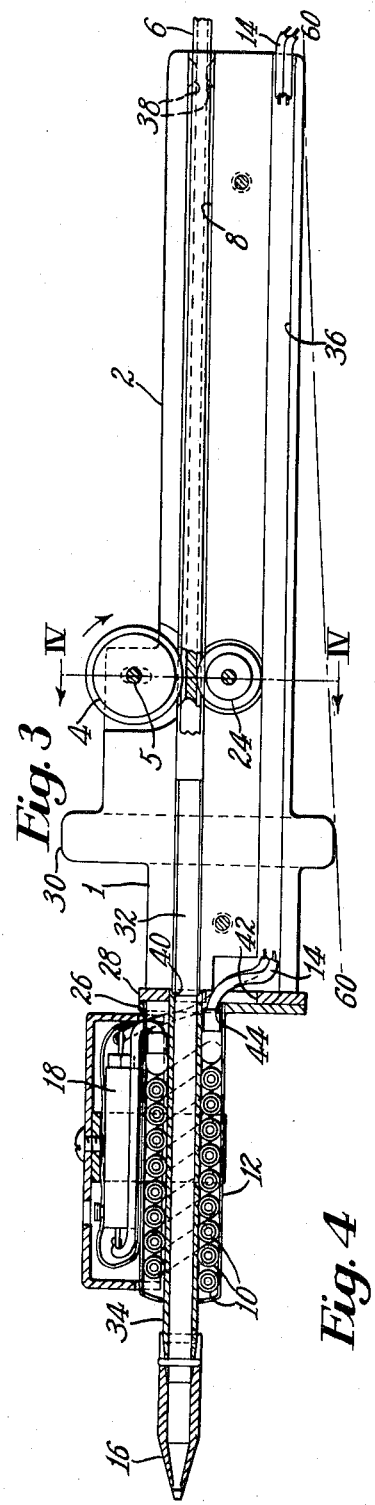
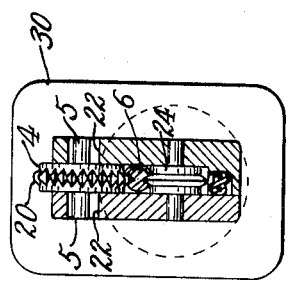

United States Patent Office 3,232,509
Patented Feb. 1, 1966

3,232,509
THERMOGRIP GUNS
Albert E. Newton, Beverly, Mass., assignor to United Shoe Machinery Corporation, Boston, Mass., a corporation of New Jersey
Filed Aug. 5, 1963, Ser. No. 299,872
2 Claims. (Cl. 226—127)

This invention relates to cement extruders and more particularly to an improved hand-held thermoplastic extrusion device.

There are many instances in which it is desirable to apply a small quantity of quick setting cement to a piece of work, for example, in closing a carton, in the manufacture of shoes, or in repairing furniture. Thermoplastic cements are very satisfactory for such work because of their quick setting properties and the strong bond which they afford. Tools for the application of thermoplastic cements often have a heatable barrel portion in which there is a passage aligned with a passage in the frame of the tool. Usually the tools are so arranged that the temperature of a thermoplastic material disposed in the passage in the frame of the tool is maintained below the melting point of the thermoplastic, while the temperature of the barrel portion is raised to a point sufficient to insure the melting of the thermoplastic disposed in that portion. A drive means is usually provided for urging the thermoplastic material from the passage in the frame to the heatable barrel portion, causing the melted material to be extruded from the barrel.

An object of the invention is to provide a low cost hand-held cement applying tool in which thermoplastic cement in convenient rod form can be easily and effectively used. A feature of the invention resides in an improved rod feeding mechanism adapted to be manually operated as the need for more cement arises.

With the foregoing object in view and in accordance with features of this invention, the novel and improved cement applying tool comprises a barrel for containing a thermoplastic material, a heating coil around the barrel for reducing the material to a fluid state so that under pressure it is easily extruded from the end of the barrel, means for exerting pressure on the barrel comprising a "floating" feed wheel means for feeding the thermoplastic material in solid rod form to the barrel, means for preventing unwanted drippage of thermoplastic when the device is not being operated, and means for protecting a supporting surface from the heat of the device when the device is set down.

The above and other objects and features of the invention will appear in the following detailed description of the preferred embodiment which is shown in the accompanying drawings and will be pointed out in the claims.

In the drawings:

FIG. 2 is a plan view;

FIG. 3 is a section taken along line III—III of FIG. 2;

FIG. 4 is a section taken along line IV—IV of FIG. 3, and

FIGS. 5 and 6 represent two of many types of nozzles that may be attached to the barrel.

Figure 1:
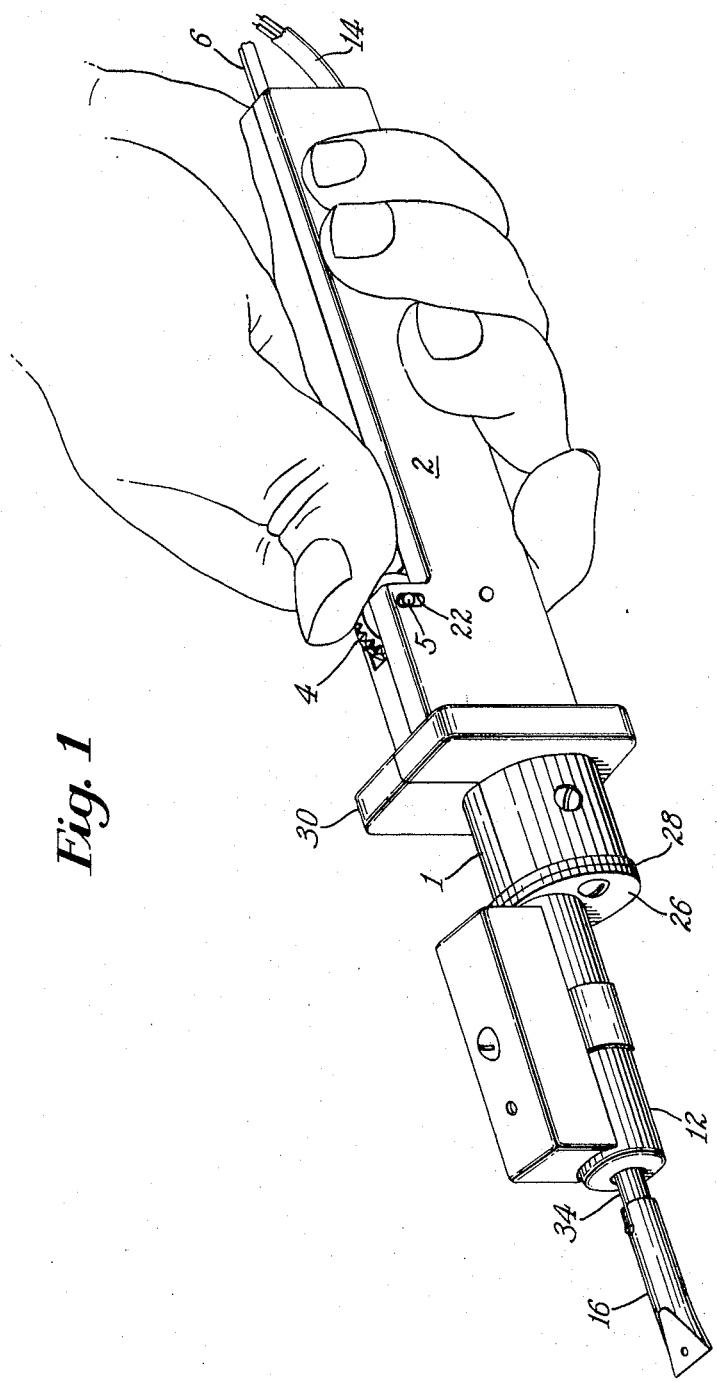
FIG. 1 is a perspective view showing one form of tool embodying the invention in use.

As illustrated, the device comprises a frame 1 including a grip portion 2. The grip 2 is adapted to retain a feed wheel 4 integral with axial extensions 5. The axial extensions 5 of the feed wheel 4 ride freely, rotatably and vertically, in a pair of slots 22. The feed wheel 4 has formed about its periphery, as by knurling, a continuous set of teeth 20.

The frame 1 has longitudinal bores 8 and 36 extending the length of the frame. The bore 8 retains a tube 32 of low friction, heat-resistant material. The bore 8 further contains a paid of guide vanes 38, the function of which will be described below. Disposed between the bores 8 and 36 and directly below the feed wheel 4 is a low-friction wheel 24.

The bore 8 is adapted to receive a thermoplastic material 6 in solid rod form, of the type disclosed in United States Letters Patent No. 2,874,084, granted February 17, 1959. Such rod form has an indentation of a generally V configuration on opposite sides of the rod (FIG. 4). The teeth 20 of the feed wheel 4 are shaped to engage one of the V portions of the thermoplastic material. The periphery of the wheel 24 is shaped to engage the other V portion of the thermoplastic material (FIG. 4). Accordingly, the guide vanes 38 are disposed within the bore 8 for engaging the V portions of the thermoplastic material 6, thereby causing the material to approach the feed wheel 4 and the low friction wheel 24 in the proper attitude.

The bore 36 retains electrical leads 14 which are adapted for "plugging in" to an ordinary 110 volt A.C. household outlet. Attached to the forward end of the frame 1 is a metal plate 28 with openings 40 and 42 therethrough. An end of the tube 32 is received in opening 40. The electrical leads 14 pass through the opening 42. Attached to and flush with the forward face of the plate 28 is a second plate 26 with an opening 44 in register with the openings 40 and 42. Through the opening 44 the electrical leads 14 enter a cylinder 12 secured within the opening 44 to the plate 26. In the opening 40 there is retained a barrel 34 in telescopic relation with the tube 32 and axially and centrally disposed in the cylinder 12 and fixedly attached to the plate 28.

Disposed concentrically about the barrel 34 is a heating coil 10 which provides sufficient heat to melt the thermoplastic material 6 in the barrel 34. A 30-watt heating coil has been found satisfactory for normal operations. The leads 14 carry electrical current to the heating coil 10, the heat output of which is controlled by a thermostat 18 mounted upon the cylinder 12. A nozzle 16 is detachably secured to the barrel 34. Interchangeable nozzles such as 16a and 16b (FIGS. 5 and 6) may be used and may be provided with bayonet type fittings to facilitate easy removal and replacement. A guard 30 is disposed circumferentially about the frame 1 forward of the grip portion 2 and forward of the center of gravity of the device, for purposes explained below.

In operation, the leads 14 are connected to an ordinary household outlet. A nozzle is chosen by the operator according to the task at hand. Nozzle 16, for example, is a combination wedge and nozzle, the tip being a wedge with holes provided on the upper and lower wedge surface. This nozzle is ideal for forcing apart two surfaces for the insertion of cement therebetween. The nozzle 16a provides a broad band of cement and the nozzle 16b affords the conventional drop or string-like extrusion. The nozzle selected by the operator is secured to the barrel 34 by a simple push and twist movement, the bayonet type joint effecting a secure connection of the nozzle to the barrel.

The device is held in the hand, as shown in FIG. 1, with the palm and fingers of the hand disposed about the grip portion 2 of the frame 1. The thumb of the hand is rested upon the feed wheel 4. A thermoplastic rod 6, inserted in the bore 8, is heated by the coil 10 in the cylinder 12 by current through the lead wires 14 disposed in the bore 36. Heating of the thermoplastic material transforms the material in the barrel 34 from solid rod form into a fluid capable of flow through the nozzle 16. The degree of heat output of the coil 10 is controlled by the thermostat 18.

As additional thermoplastic material is required, the operator depresses the feed wheel 4 and at the same time "thumbs" the feed wheel 4 towards himself a number of degrees proportional to the additional amount of thermoplastic desired. The feed wheel 4 is thereby caused to move downwards in slots 22 and in a clockwise direction upon the axial extensions 5, as indicated in FIG. 3. The teeth 20 of the feed wheel 4 embed in the surface of the thermoplastic rod 6 and urge it toward the barrel 34, thereby presenting fresh material to the heating coil 10 and also putting pressure upon the fluid material in the barrel 34 and the nozzle 16 so as to cause it to extrude from nozzle 16. The wheel 24 presents a low-friction surface which engages the V on the side of the cement rod 6 opposite the feed wheel 4 (FIG. 4) and supports the cement opposite the area where pressure is applied by the feed wheel 4. Additionally, the tube 32 presents a low-friction surface from the area of the feed wheel 4 to the area of the cylinder 12.

The metal plates 26 and 28 act as fins for air cooling, thereby dissipating most of the heat from the cylinder 12 before its passage to the grip 2. Tube 32 further shields the thermoplastic rod 6 from heat from the coil 10 until the rod 6 enters the barrel 34.

After completion of a cementing operation, the operator depresses the feed wheel 4 and "thumbs" the feed wheel 4 in a direction toward the nozzle 16, causing the teeth 20 to engage the cement rod 6 and urge the cement rod 6 in a direction away from the nozzle 16. The rearward movement of the cement rod 6 from barrel 34 causes a suction to develop in the barrel 34 and the nozzle 16 which draws the fluid cement in this area away from the opening of the nozzle 16. The operator may then set the device aside without fear of drippage from the nozzle 16.

The guard 30 prevents the plates 26, 28 and other "hot" parts of the device from touching a table top when the device is set down. The guard 30 acts as a pivot about which the device swings by gravity when not in use and is placed on a plane supporting surface such as represented by the line 50—50 of FIG. 2 and 60—60 of FIG. 3. The heated nozzle area is held out of contact with the supporting surface.

As an additional feature of the present invention, an adjustable thermostat may be utilized, thereby offering a range of heat output of the coil. Further, the grip portion of the frame may be knurled so as to better receive the fingers of the hand, or may be curved in pistol-grip fashion. Even in the form shown, an operator may prefer to use the device in an inverted position, in which instance the forefinger of the operating hand would engage the feed wheel 4 much as it would a trigger. When used in this manner, urging of the feed wheel 4 toward the operator affords additional cement at the nozzle 16 and urging the feed wheel 4 in the opposite direction insures against drippage. In such instance the feed wheel 4 moves upwards in slots 22 rotatably to engage the thermoplastic rod 6.

Having thus described my invention, what I claim as new and desire to secure by Letters Patent of the United States is:

1. In a portable cement applying device for melting and applying thermoplastic material having a heatable barrel portion aligned with a passage in a grip portion of the apparatus and having an outlet aligned with the barrel portion, guide means in said passage for engaging a thermoplastic rod having opposed V-shaped indentation therein, a feed means for urging said thermoplastic material from said passage into said heatable barrel portion, said feed means comprising a hand operated feed wheel rotatably mounted on said grip and having V-shaped teeth about its periphery engageable with one of said indentations, and a low friction wheel rotatably disposed in said grip on the opposite side of the thermoplastic rod from the feed wheel and having a V-shaped periphery engageable with the second of said indentations for providing low friction support.

2. In a portable cement applying device for melting and applying thermoplastic material having a heatable barrel portion aligned with a passage in a grip portion of the apparatus and having an outlet aligned with the barrel portion, guide means in said passage for engaging a thermoplastic rod having opposed V-shaped indentations therein, said guide means comprising a plurality of guide vanes engageable with said indentations, a feed means for urging said thermoplastic material from the passage into the heatable barrel portion, said feed means comprising a hand operated feed wheel rotatably mounted on said grip and having V-shaped teeth about its periphery engageable with one of said indentations, said thermoplastic rod being positioned by said guide means whereby one of said indentations is disposed to receive said feed wheel teeth, and a low friction wheel rotatably disposed in said grip on the opposite side of the thermoplastic rod from the feed wheel and having a V-shaped periphery engageable with the second of said opposed indentations for providing low friction support.

References Cited by the Examiner

UNITED STATES PATENTS

| | | | |
|---|---|---|---|
| 1,308,994 | 7/1919 | Rohne | 219—26 |
| 1,449,517 | 3/1923 | Lame | 219—27.1 |
| 2,001,538 | 5/1935 | Muller et al. | 219—26 |
| 2,552,253 | 5/1951 | Brown | 219—26 |
| 2,758,192 | 8/1956 | Gustafsson | 219—27 |
| 2,995,159 | 8/1961 | Berggren | 219—27 |

FOREIGN PATENTS

| | | |
|---|---|---|
| 577,204 | 5/1924 | France. |
| 1,149,413 | 7/1957 | France. |

ROBERT B. REEVES, *Primary Examiner.*

ANTHONY BARTIS, *Examiner.*